United States Patent

Stark

[11] Patent Number: 6,139,002
[45] Date of Patent: Oct. 31, 2000

[54] SINGLE-NIPPLE CLAMPING WITH CORRECT POSITIONING

[76] Inventor: Emil Stark, Komminger Strasse 48, A-6840 Gotzis, Austria

[21] Appl. No.: 09/063,158

[22] Filed: Apr. 20, 1998

[30] Foreign Application Priority Data

Apr. 22, 1997 [DE] Germany .................... 197 16 797

[51] Int. Cl.[7] .................................................. B23Q 3/00
[52] U.S. Cl. ............................................. 269/309; 269/20
[58] Field of Search ............................ 269/309, 20, 57; 254/93 H; 198/345.1

[56] References Cited

U.S. PATENT DOCUMENTS

| | | | |
|---|---|---|---|
| 3,986,617 | 10/1976 | Blomquist | ................................ 269/57 |
| 4,703,916 | 11/1987 | Hung | ........................................ 254/93 |
| 5,415,384 | 5/1995 | Obrist et al. | ............................ 269/309 |

FOREIGN PATENT DOCUMENTS

| | | | |
|---|---|---|---|
| 0356217 | 2/1990 | European Pat. Off. | ............... 269/309 |
| 0441437 | 8/1991 | European Pat. Off. | ................ 269/20 |
| 405138471 | 6/1993 | Japan | ...................... 269/20 |

*Primary Examiner*—David A. Scherbel
*Assistant Examiner*—Daniel Shanley
*Attorney, Agent, or Firm*—Lackenbach Siegel

[57] ABSTRACT

Arrangement for clamping and positioning palettes in the correct position, wherein for the clamping of the palettes a draw-in nipple cooperates with a rapid-clamping cylinder. Addtionally, a rotation safeguard is present between the palette and the associated rapid clamping cylinder. This safeguard against rotation is implemented in the form of localizing pins which have a corresponding mechanical strength to prevent movement when clamping force is exerted.

10 Claims, 9 Drawing Sheets

SINGLE-NIPPLE CLAMPING WITH CORRECT POSITIONING

BACKGROUND OF THE INVENTION

Subject matter of the present invention is an arrangement for clamping and correctly positioning palettes.

With a publication by the same applicant it has already become known to hold a palette via several draw-in nipples with associated rapid-clamping cylinders. The draw-in nipples are herein inserted into the rapid-clamping cylinders in which they are pulled downwardly. This insertion leads to the fact that the draw-in nipple, respectively an associated structural part secured on the palette, is centered opposing the rapid-clamping cylinder. The draw-in force is herein so high that the palette is held completely securely and immovably in a position precisely determined with respect to the correct position opposing the rapid clamping cylinder.

However, it has been found in practice that it is in some cases desirable to use relatively small palettes. These palettes do not need to be provided with several draw-in nipples since a single draw-in nipple ensures sufficient securement.

However, when using only a single draw-in nipple, the problem is encountered that the palette together with the draw-in nipple can be rotated with respect to the rapid-clamping cylinder. In the case of the palettes known so far which operate with several draw-in nipples, this danger did not exist. Here a safeguard against rotating is attained by applying several draw-in nipples.

SUMMARY OF THE INVENTION

It is therefore the task of the present invention to develop further an arrangement of the above cited type in which a palette can be placed with only a single draw-in nipple in a precisely defined position onto the associated rapid-clamping cylinder and can be secured on it.

This task is solved according to the invention through the technical teaching disclosed below.

It is essential herein that the palette be provided with only one single draw-in nipple and simultaneously a rotation safeguard between the palette and the associated rapid-clamping cylinder is present. This safeguard against rotation is implemented in the form of localizing pins which have corresponding mechanical strength.

This yields the substantial advantage that now relatively small palettes, contrary to the requirement of prior art, need not be provided with several draw-in nipples but rather a substantial decrease of the costs and simplification of construction can be attained.

The rotation safeguard can herein be implemented in various ways.

A first embodiment provides that the palette is provided with pins which are in contact on associated stop faces of the rapid-clamping cylinder. It is understood that it is also possible to secure these pins on the rapid-clamping cylinder and to provide the stop faces on the palette.

The number of pins depends on the torque occurring during the working. Depending on the magnitude of the torque, two, four, six or more of these pins can be provided.

In a first embodiment it is provided to dispose the pins for the rotation safeguard such that a pivoting about 90°, thus about a right angle, is attained. To this end the contact faces of the rapid-clamping cylinder are implemented accordingly such that by detaching the rotation safeguard the palette can be rotated correspondingly. Thereby it becomes possible to work the clamped-in workpieces in 90° steps.

As already described, it is also possible to secure these pins on the rapid-clamping cylinder and to provide the stop faces on the palette.

A further embodiment provides that the pins are disposed at 120° angles. It is sensible if the associated stop faces of the rapid-clamping cylinder are in this case also disposed at 120° angles. Thus, if required, the workpiece to be worked can be rotated according to this angular division.

In an advantageous further development of the invention it is provided to implement the rotation safeguard such that the palette can be placed in several angular positions onto the rapid-clamping cylinder and can be held reliably in these angular positions. In particular, for some working steps it may be required to work the palette first in a first position and subsequently to rotate it by a specific angle, newly to secure it and then to work it again. Through a suitable selection of the angle steps, the rotation safeguard can be maintained according to the working specification extremely precisely with respect to the rapid-clamping cylinder. Thus any desired angle displacement is possible.

A substantial advantage of the system comprising draw-in nipple and rapid-clamping cylinder comprises that the palette itself is held in a precisely defined position relative to the machine tool. It is preferred if the palette itself now comprises suitable stop or contact faces for the workpiece(s) to be worked such that these also, as soon as the palette is clamped tightly, are in a precisely defined position. Retrofitting or adjusting to compensate assembly tolerances can be avoided in this way.

The subject matter of the present invention is evident not only from the subject matter of the individual patent claims but rather also from the combination of the individual patent claims with one another.

All specifications and characteristics disclosed in the documents, including the abstract, in particular the spatial implementation depicted in the drawings are claimed as being essential to the invention to the extent they are singly or in combination novel relative to prior art.

In the following the invention will be explained in further detail in conjunction with drawings depicting only one implementation path. The drawings and their description disclose further characteristics essential to the invention and advantages of the invention.

DETAILED DESCRIPTION

Figure 1:
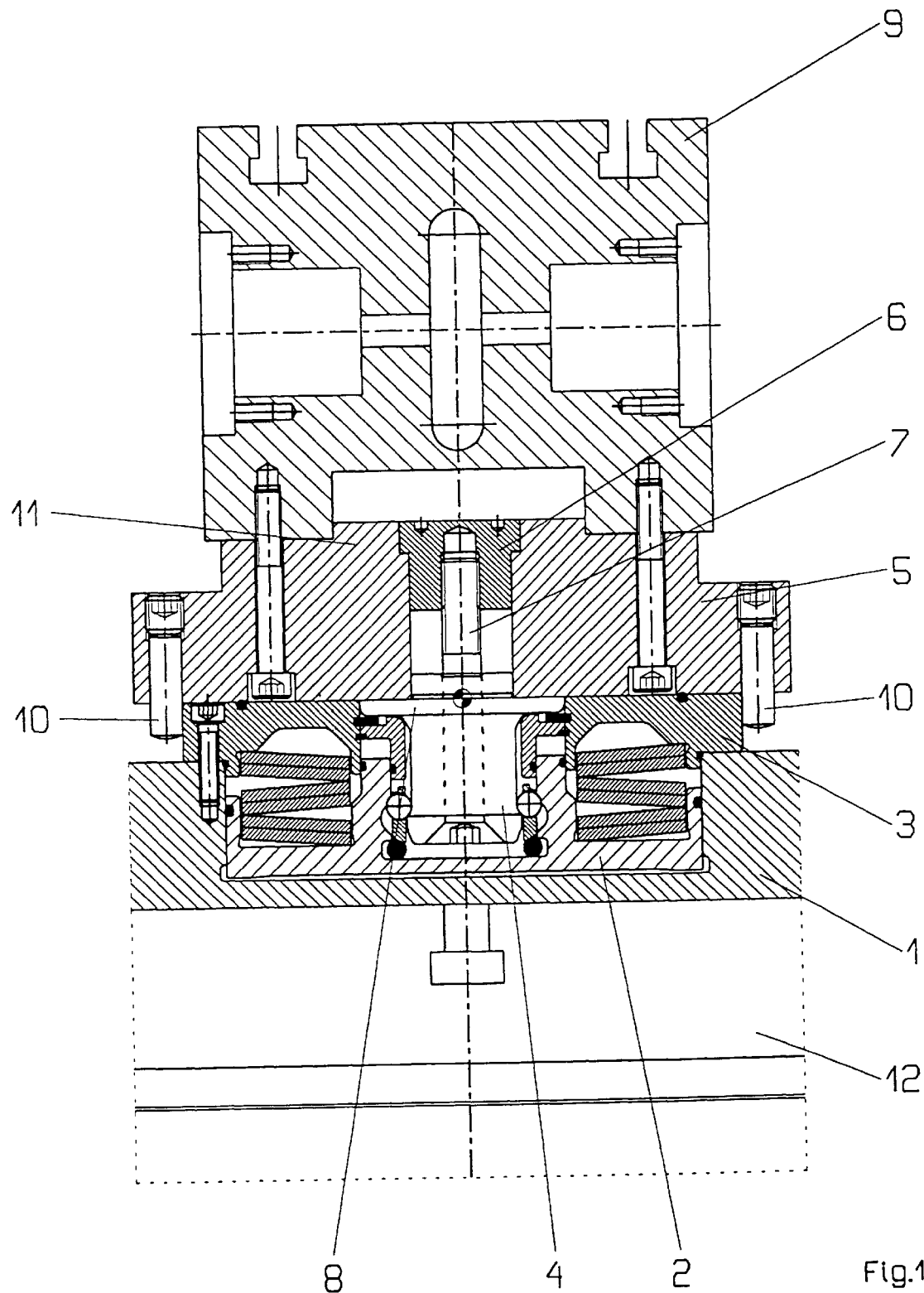
FIG. 1 a section through an arrangement according to the invention.
Figure 7:
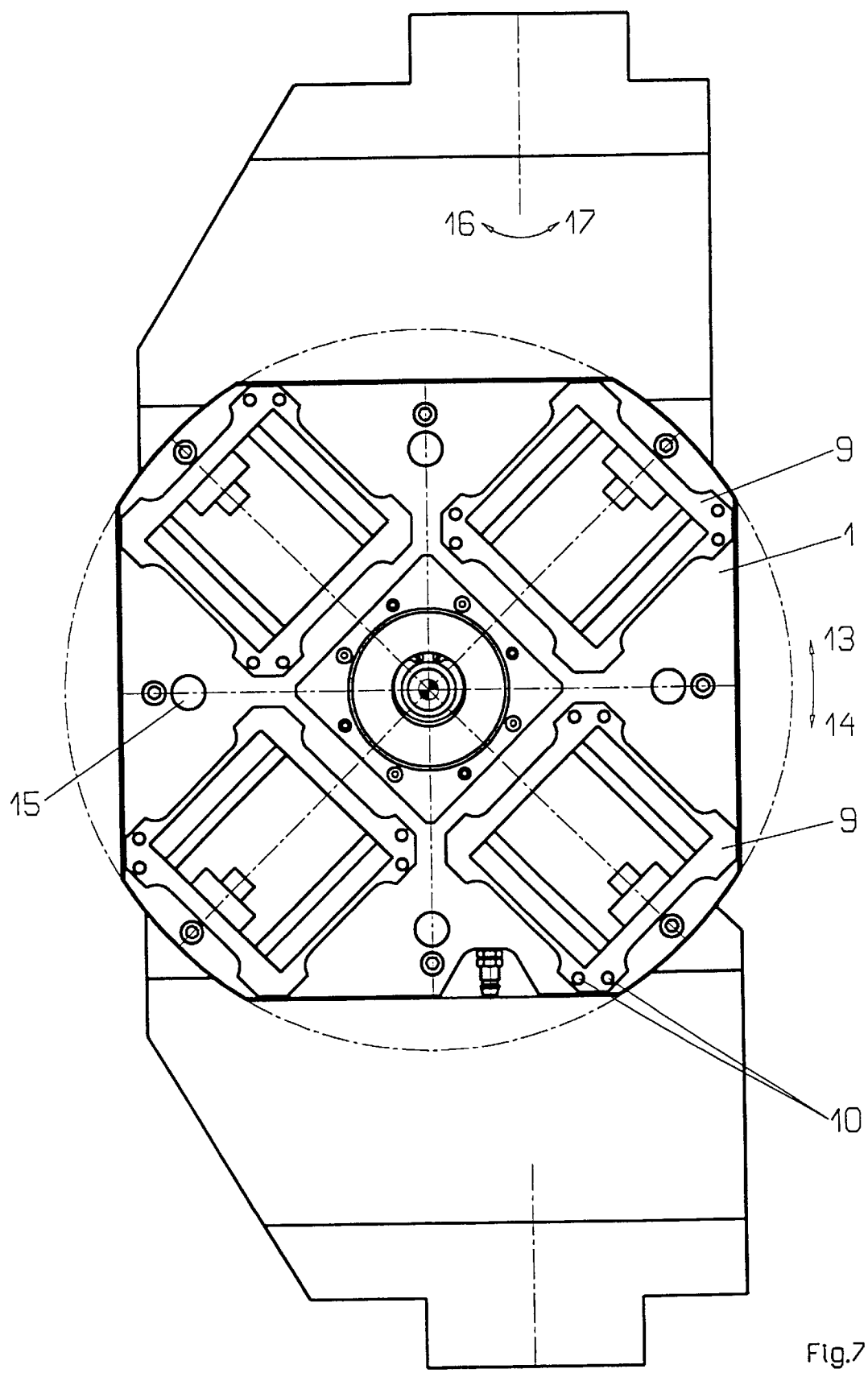
FIG. 7 a view according to FIG. 5 in a further embodiment.

FIGS. 1 and 7 show an embodiment of the present invention. Herein a plate 1 is provided with one or several rapid-clamping cylinders 2 with associated covers 3. The covers 3 are penetrated by one draw-in nipple 4 each which, in turn, is secured in a palette 5 via a counterhead 6 and a threaded rod 7. The draw-in nipple 4 is herein provided with a ring flange 8 which is in contact in an associated recess of the cover 3 and in this way ensures the centering of the draw-in nipple and thus the associated palette 5.

On the palette 5 is secured a workpiece 9 which in the embodiment shown is centered via a shoulder 11 of the palette with respect to the latter. Thus the workpiece 9 is disposed in a precisely defined position relative to the plate 1.

The rotation safeguarding between the palette 5 and the rapid-clamping cylinder 2 takes place in the embodiment example shown via several pins 10 fastened on the palette 5. These pins are set into bores fabricated with high precision and come to rest in contact on associated stop faces on cover 3 of the rapid-clamping cylinder. As already explained above, the number of the pins 10 used depends on the magnitude of the load.

The entire plate 1 can be fastened on a table 12 of a machine tool.

Figure 2:
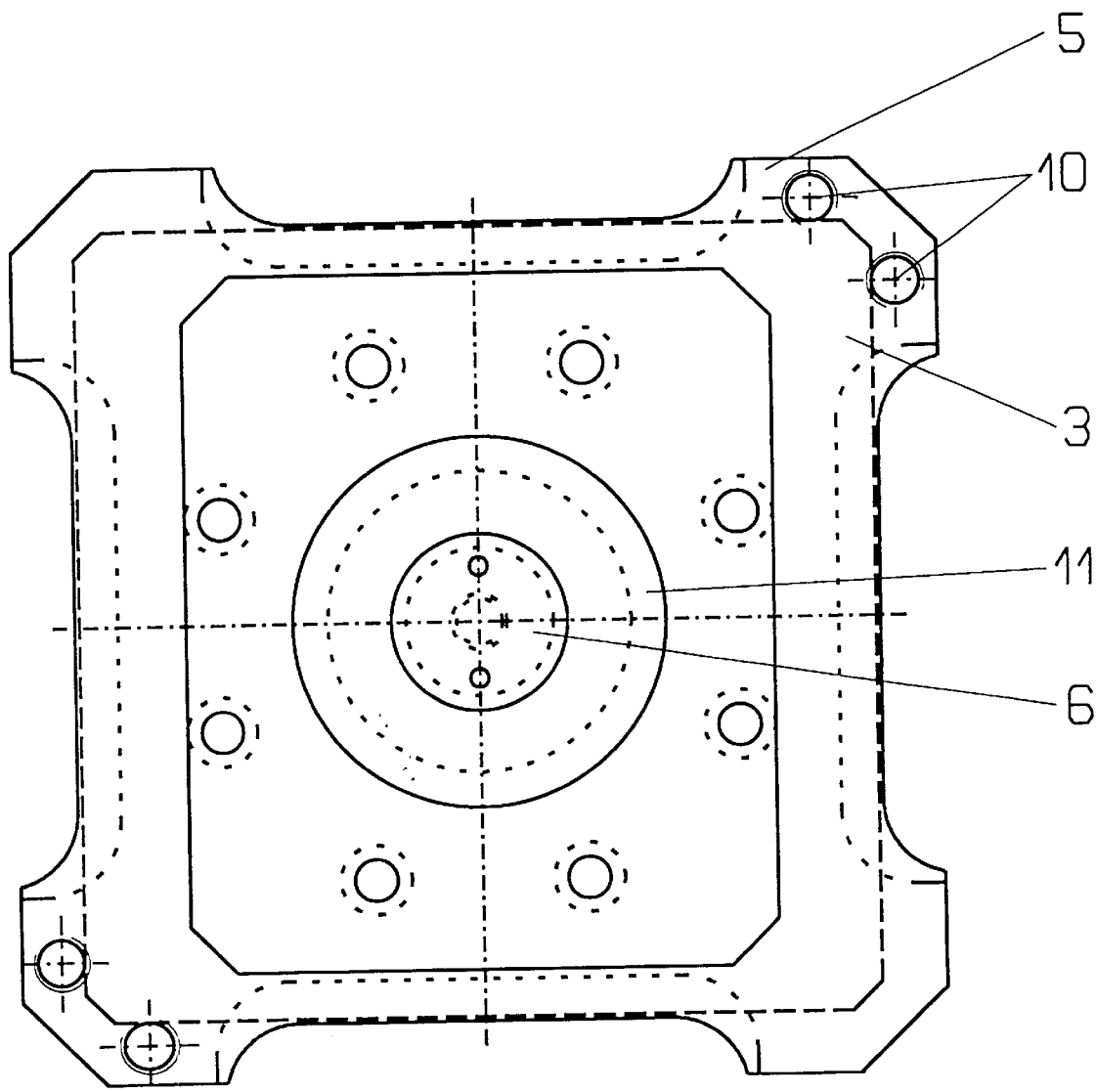
FIG. 2 a top view onto an arrangement according to the invention with a palette secured.

In the top view according to FIG. 2 it is evident that the pins 10 are provided on opposing corners of cover 3. The shoulder 11 can also be seen clearly, which, in the embodiment example shown, is circular.

It is understood that it is also possible to secure not only a single workpiece 9 but also several workpieces. The securement can either, as shown, take place with bolts; but any other suitable type of securement can also be used.

Figure 3:
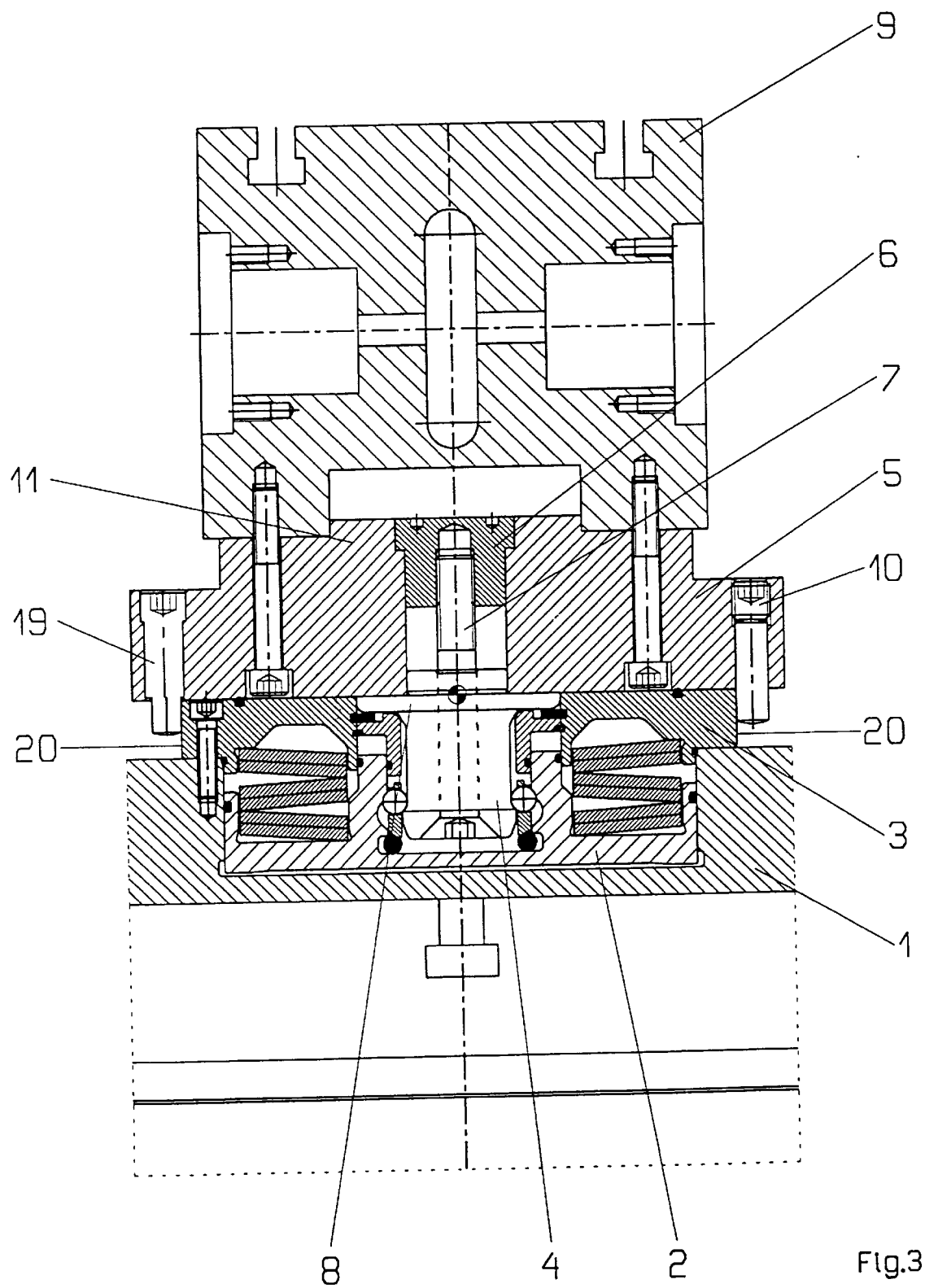
FIG. 3 a special embodiment of FIG. 1 with pins realized eccentrically.
Figure 4:
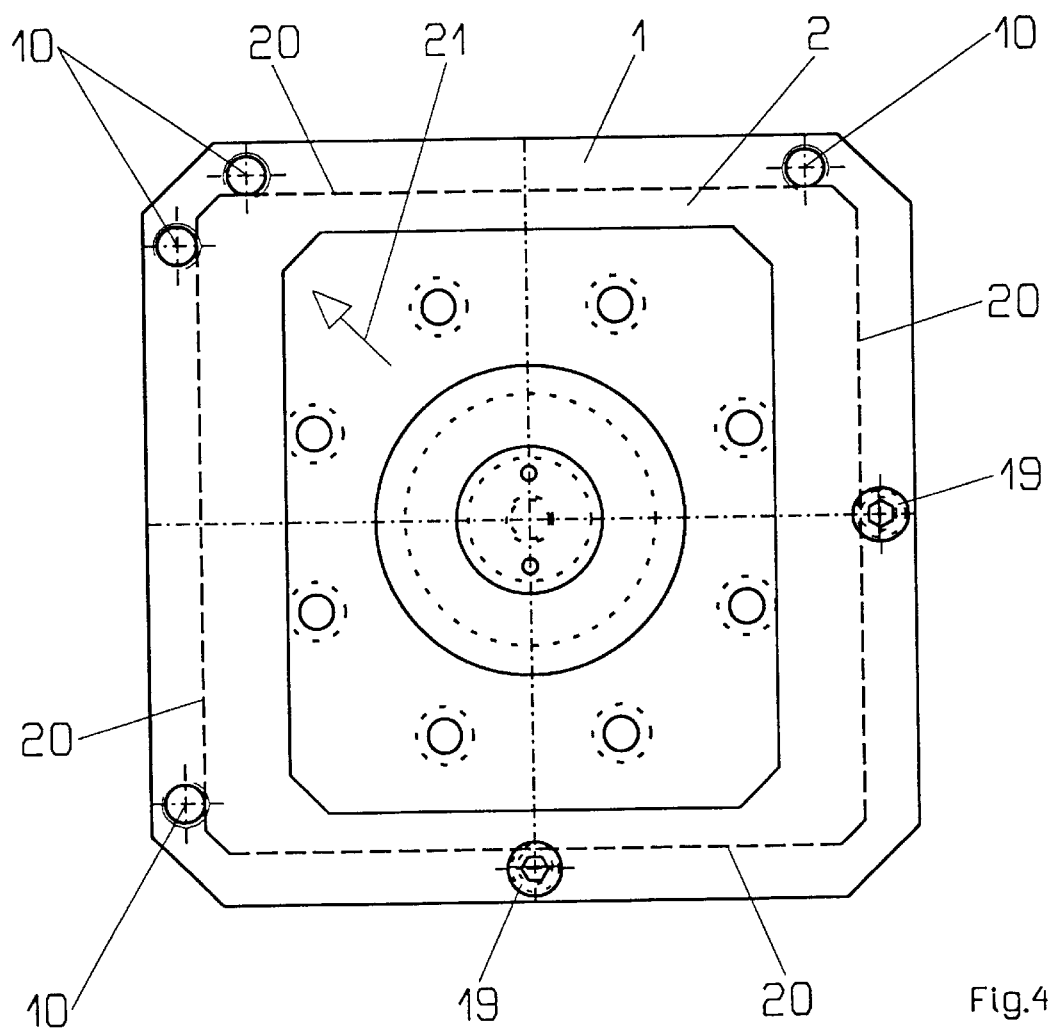
FIG. 4 a top view onto an arrangement according to the invention with secured palette according to FIG. 3.

FIGS. 3 and 4 show a embodiment in which on two of four sides the pins 10 of the rotation safeguard clearly are implemented eccentrically.

In FIG. 3 the left pin 19 is represented such that the eccentricity is clearly visible. The right pin 10 is thus implemented as a conventional round pin. For localizing the palette 1 [5] in this embodiment it is sufficient if in a rectangular, seen from above, preferably square configuration, two pins, not opposing one another, are implemented eccentrically.

The principle of this localization is evident based on the configuration in top view in FIG. 4. Therein a palette 1 [5] formed substantially in square form, is held securely on its opposing sides through a three-point localization. A first orientation of the palette takes place by stacking the palette 1 [5] and rapid-clamping cylinder 3 one above the other. The localization of the palette 1 [5] takes place via the adjustment of the eccentrically formed pins 19 such that the palette becomes localized relative to the rapid-clamping cylinder 2 in the direction of arrow 21. In this special embodiment a localization through six pins 10, 19 is provided. This arrangement, however, is not absolutely necessary and can be varied in any desired way or be reinforced in terms of holding force through further pins. It is therein up to the user's discretion in which configuration and number the rotation safeguard of the palette is implemented.

Important in this arrangement is the variable distance between the round pins 10 and the eccentric pins 19 which results by rotation of the eccentric pins 19. Through this arrangement the capability is opened for adjusting the rotation safeguard between palette 1 [5] and the rapid clamping cylinder 2 exactly to the dimensions of the structural parts.

In FIGS. 5 to 9 a plate 1 is shown which is provided with five rapid-clamping cylinders 2 implemented substantially identically. In the embodiments shown, the plate 1 is fastened on the table 12 and rotatable in the direction of arrow 13, 14. The stop circle is herein indicated in dashed lines.

Fixing the plate 1 on the table 12 can herein take place either via set pins 15 with associated screws; but it is also possible to provide the plate 1 again with one or several draw-in nipples and to receive these in associated rapid-clamping cylinders of the table 12.

In order to increase the options for application, in addition to the rotation in the directions of arrow 13, 14, the pivoting in the directions of arrow 16, 17 can be provided.

The rapid-clamping cylinders 2 can be supplied via a schematically shown hydraulic connection with oil under pressure in order to bring about the drawing-in of the draw-in nipples 4.

Figure 5:
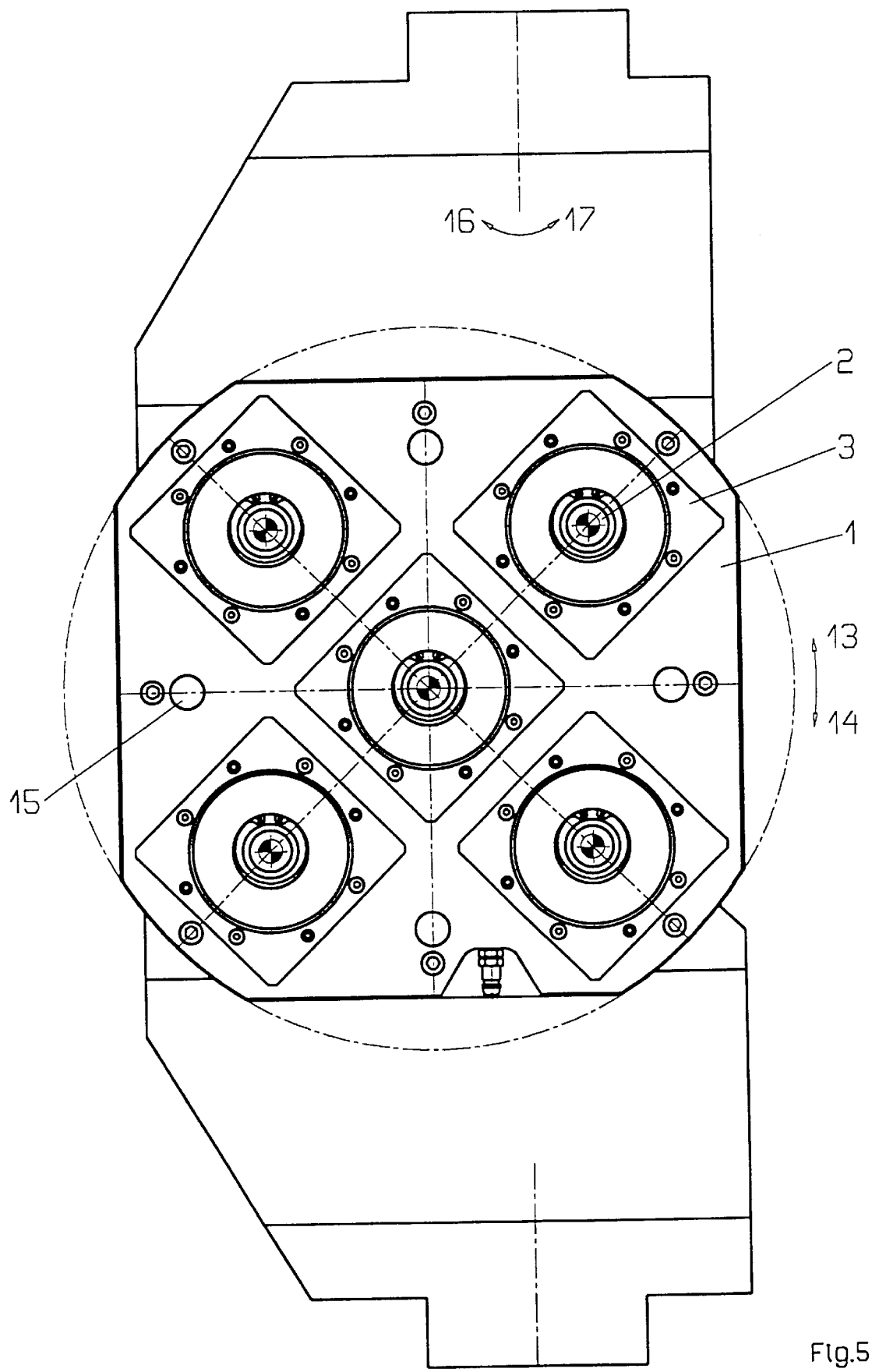
FIG. 5 a top view onto an advantageous further development in a first embodiment.

FIG. 5 shows a view in which no palettes 5 have been emplaced. A variety of combination capabilities results. It is for example possible to fit each of the upper two rapid-clamping cylinders 2 individually or with a common palette. It is also possible to use the diagonals; it is also possible to use each rapid-clamping cylinder 2 singly.

Figure 6:
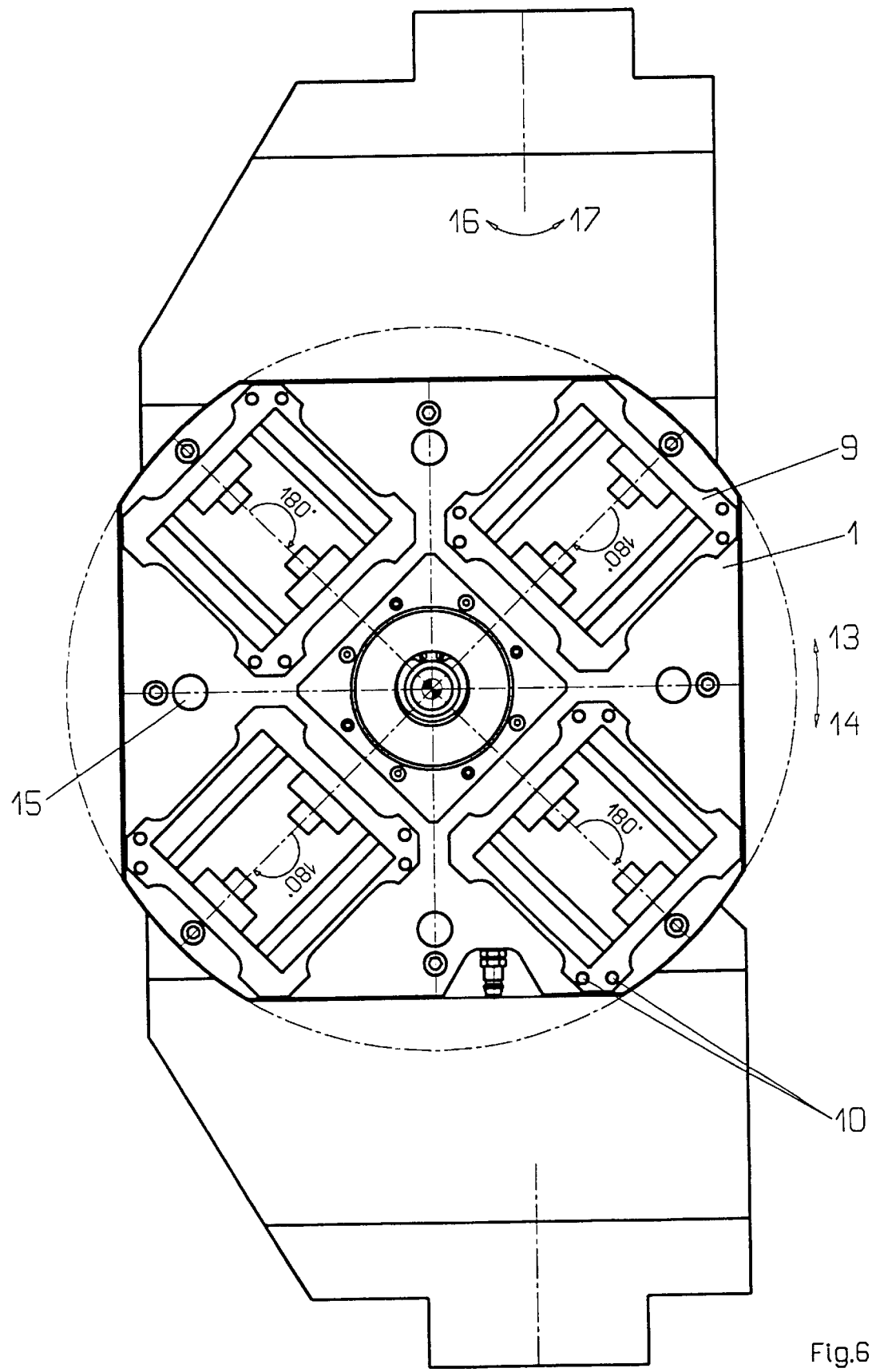
FIG. 6 a view according to FIG. 5 in a second embodiment.

The embodiment according to FIG. 6 shows the loading of plate 1 with overall four workpieces, wherein the center space remains free. Each of these workpieces can thus be worked on the three outer sides as well as on the top side without a reclamping needing to be carried out. With a correspondingly structurally small [tool] head, it can moreover also be possible to work the inside also.

Initially each side of a first workpiece is worked, subsequently the plate 1 is rotated by 90° for example in the direction of arrow 13, whereupon the second workpiece is worked. As soon as all workpieces 9 have been worked, they can be rotated manually by 180° in order to work also the side previously disposed on the inside. Depending on the requirements, another working sequence can also be provided.

FIG. 7 shows workpieces in which such rotation is not required. The difference compared to FIG. 6 lies therein that the inside is not being worked, as is evident based on the bores shown schematically according to FIGS. 6, 7.

Figure 8:
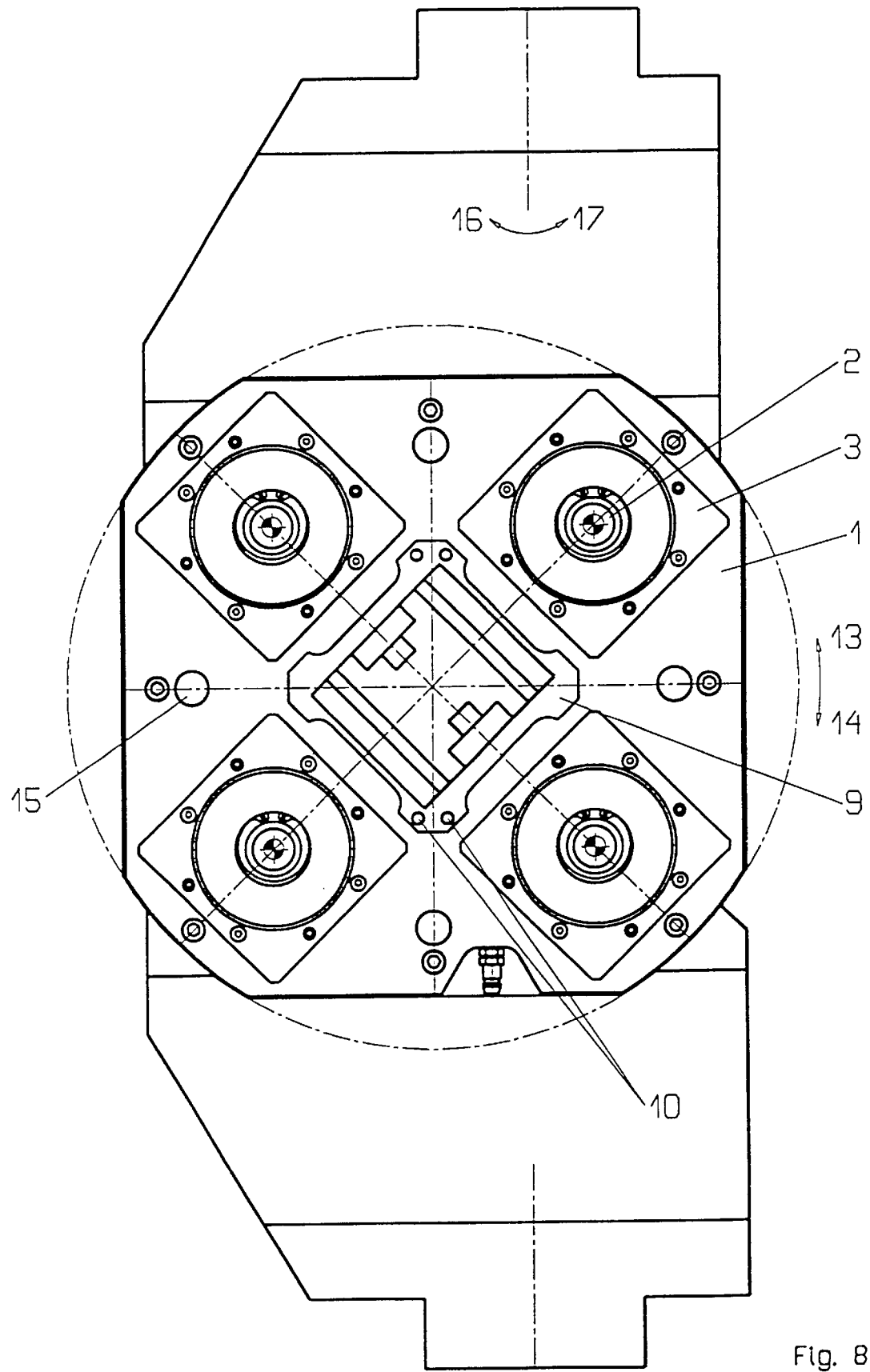
FIG. 8 a view according to FIG. 5 in a fourth embodiment.

In the embodiment according to FIG. 8 only one single workpiece 9 is clamped centrally. This workpiece can be worked on five sides without needing to perform a reclamping step.

The embodiments according to FIGS. 6 to 8 permit substantially lesser reclamping times. In particular in the clamping according to FIGS. 7 and 8 it is possible to work continuously without any reclamping. The retooling times of the machine are considerably reduced.

FIG. 6 requires only the manual reclamping which can be performed without major time expenditures.

Figure 9:
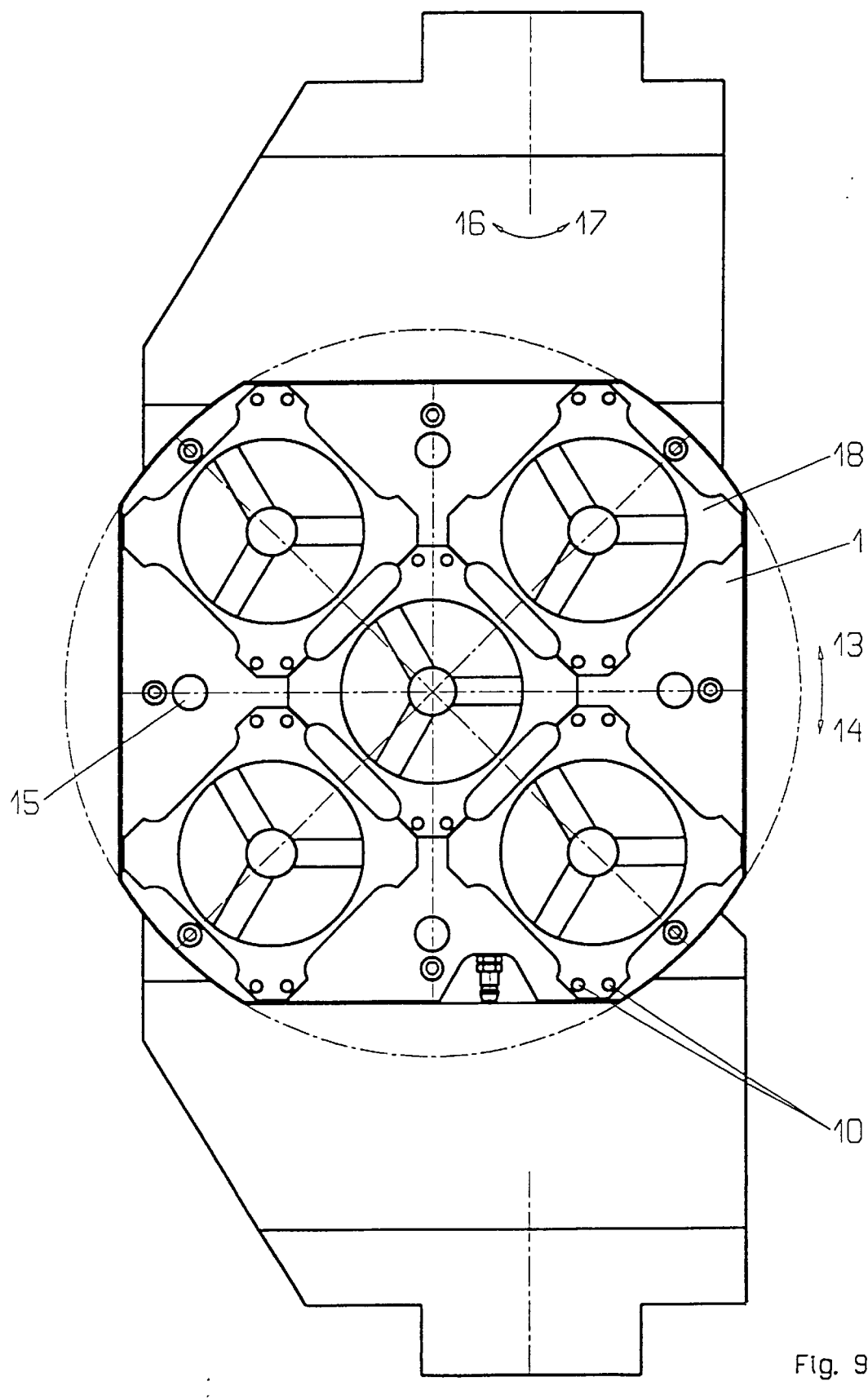
FIG. 9 a fifth embodiment in a view according to FIG. 5.

In the embodiment according to FIG. 9, instead of the palette 5, jaw chucks 18 can be provided. These jaw chucks 18 can be fastened for example on associated, somewhat modified palettes according to FIG. 1 with bolts or in another way. The embodiment according to FIG. 9 permits, for example, working 5 workpieces simultaneously, in which only the working from the top is provided, such as for example the introduction of bores into shafts. Here also, no reclamping of any kind is required.

Through the suitable implementation of the rapid-clamping cylinder 2, respectively their cover 3, it can thus be attained that a single palette is held torsion-tight with a single draw-in nipple. But simultaneously, as previously, several rapid-clamping cylinders can cooperate in order to clamp a single palette.

Overall the feasibility results of working with substantially smaller palettes at lower fabrication expenditures.

What is claimed is:

1. Arrangement for clamping and positioning palettes in a desired position, comprising: a clamping draw-in nipple cooperating with a rapid-clamping cylinder and defining a main axis (A) along which said draw-in nipple can move relative to said rapid-clamping cylinder; and rotation safeguard means between the palette and the rapid-clamping cylinder, which comprises a plurality of longitudinal pins, each having a pin axis (A') substantially parallel to said main axis, each pin being associated with a corresponding stop face substantially fixed against rotational movements about said main axis, whereby engagement between said pins and their associated stop faces prevents angular movements of the palette about said main axis.

2. Arrangement as claimed in claim 1, characterized in that the rotation safeguard comprises a combination of pins wherein a portion of the pins is preferably implemented round (10), and a further portion of the pins in the contact region with the stop face (20) is implemented eccentrically (19).

3. Arrangement as claimed in claim 1, characterized in that the disposition of the pins takes place in the way that with the rectangular shape of the cover (3) of the rapid-clamping cylinder (2) they are disposed such that they encompass this rectangular form of the cover, wherein round pins (10) and eccentric pins (19) are disposed opposingly, with only one type of pin being disposed for each side.

4. Arrangement as claimed in claim 2, characterized in that the disposition of the pins takes place in the way that with the rectangular shape of the cover (3) of the rapid-clamping cylinder (2) they are disposed such that they encompass this rectangular form of the cover, wherein round pins (10) and eccentric pins (19) are disposed opposingly, with only one type of pin being disposed for each side.

5. Arrangement as claimed in claim 1, characterized in that the disposition of the pins takes place in a way such that with triangular shape of the cover (3) of the rapid-clamping cylinder (2) they encompass this triangular form of the cover, wherein round pins (10) and eccentric pins (19) are disposed such that at least on one side at least one eccentric pin (19) is disposed and for each side only one type of pin is disposed.

6. Arrangement as claimed in claim 2, characterized in that the disposition of the pins takes place in a way such that with triangular shape of the cover (3) of the rapid-clamping cylinder (2) they encompass this triangular form of the cover, wherein round pins (10) and eccentric pins (19) are disposed such that at least on one side at least one eccentric pin (19) is disposed and for each side only one type of pin is disposed.

7. Arrangement as claimed in claim 1, characterized in that the pins (10, 19) are disposed on the palette (5) and that the associated stop faces (20) are disposed on the cover (3) of the rapid-clamp cylinder (2).

8. Arrangement as claimed in claim 1, characterized in that the pins (10, 19) are disposed on the cover (3) of the rapid-clamping cylinder (2) and that the associated stop faces (20) are disposed on the palette (5).

9. Arrangement as claimed in claim 1, characterized in that a centering of the workpiece (9) relative to the palette (5) takes place through the stop faces (20).

10. Arrangement as claimed in claim 1, characterized in that on the palette (5) several workpieces are secured.

* * * * *